T. A. MILLER.
WHEEL.
APPLICATION FILED JUNE 26, 1912.
1,161,505.
Patented Nov. 23, 1915.
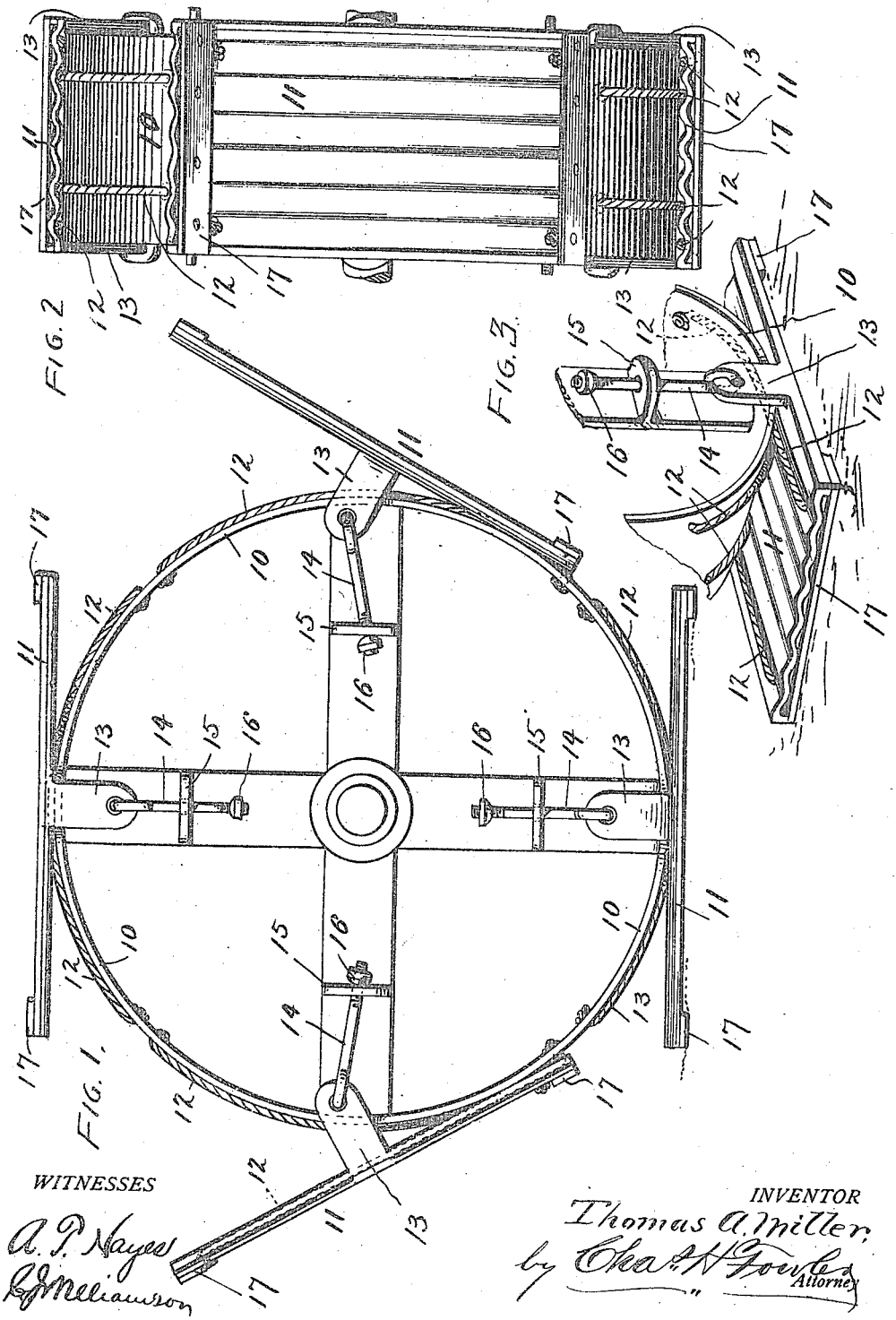
WITNESSES
INVENTOR
Thomas A. Miller
by Chas H Fowler
Attorney

UNITED STATES PATENT OFFICE.

THOMAS ASBURY MILLER, OF STOCKTON, CALIFORNIA.

WHEEL.

1,161,505.  Specification of Letters Patent.  Patented Nov. 23, 1915.

Application filed June 26, 1912. Serial No. 706,069.

*To all whom it may concern:*

Be it known that I, THOMAS A. MILLER, a citizen of the United States, residing at Stockton, in the county of San Joaquin and State of California, have invented certain new and useful Improvements in Wheels, and do hereby declare that the following is a full, clear, and exact description of the same, reference being had to the annexed drawings, making a part of this specification, and to the letters and figures of reference marked thereon.

The object of my invention is to provide an efficient and durable form of wheel-carried track, so that as the vehicle moves along, a suitable track or bearing for it upon the ground, will be laid and lifted, and I contemplate the application of my invention to traction engines, farm wagons, automobiles, and any form of wheeled vehicle to which such a device is applicable.

In the annexed drawings—Figure 1 is a side elevation of a wheel embodying my invention; Fig. 2 is an end elevation thereof; Fig. 3 is a detail view in perspective of one of the bearing plates, or track sections, and adjacent portions of the wheel.

In the embodiment of my invention shown in the drawings, I attach to the circumference or tire of the wheel 10, a circumferential series of plates 11, by a flexible connection in the form of ropes 12, preferably of wire, or chains, which at one end are attached to the plate and at the other end attached to the wheel tire, and arranged in oppositely extending pairs; and preferably a pair near each side of the wheel, when the latter is quite broad. Thus, when a plate is upon the ground, there can be a rolling movement of the wheel upon it, as one rope of a pair will, in effect unwind from the periphery of the tire and the other rope wind thereon. To limit the extent of independent movement of the wheel over the plate or track-section, and to lift the latter from the ground, I pivotally connect to an ear or lug 13, at each side of the plate, one end of a rod 14 which plays through a perforated lug 15 on the side of one of the wheel spokes, and on its inner end has a shoulder or set collar 16 which by the outward sliding of the rod through the lug 15, is brought against the latter whereby, on the further onward movement of the wheel, the plate is lifted. The plate lugs 13, as they pass inward alongside the wheel tire, serve to prevent lateral, or sidewise movement of the plates, or track-sections. Of course, other forms of flexible connection between the plates 12 and the spokes than the lugs and rods can be employed, such, for instance, as a simple length of chain.

Preferably the plates or track sections are longitudinally grooved or corrugated and at each of their ends on the outer sides there is a cross bar 17. The plates thus made are strong, and take a good grip on the ground; and the grooves provide channels to receive the ropes 12, so that chafing thereof is avoided and a good fair bearing of the tire on the plates is assured.

I, of course, do not limit myself to any particular number of plates or track sections 11.

Having thus described my invention what I claim is—

A wheel comprising a hub, a tire, means holding said tire in spaced relation to said hub, guiding ears carried by said means, ground engaging plates, ears extending from said plates upon opposite sides of said tire, rods pivotally connected with the ears of said plates and slidably engaging the ears of said means, and flexible means connected with said tire upon opposite sides of said ears and extending along said tire in opposite directions and having their outer end portions connected with said plates.

In testimony whereof I affix my signature in presence of two witnesses.

THOMAS ASBURY MILLER.

Witnesses:
 A. J. TURNER,
 E. A. HOYE.